United States Patent [19]

Hyde et al.

[11] Patent Number: 4,478,427
[45] Date of Patent: Oct. 23, 1984

[54] FOLDABLE INFANT STROLLER

[75] Inventors: Richard E. Hyde; Lee T. Carmichael, both of Los Angeles, Calif.

[73] Assignee: California Strolee, Inc., Compton, Calif.

[21] Appl. No.: 453,147

[22] Filed: Dec. 27, 1982

[51] Int. Cl.$^3$ ............................................... B62B 7/08
[52] U.S. Cl. ..................................... 280/642; 280/650
[58] Field of Search ................ 280/38, 641, 642, 647, 280/650, 649; 297/46, DIG. 4

[56] References Cited

U.S. PATENT DOCUMENTS

| | | | |
|---|---|---|---|
| 3,653,681 | 4/1972 | Virtue | 280/642 |
| 4,065,177 | 12/1977 | Hyde et al. | 280/642 X |
| 4,386,790 | 6/1983 | Kassai | 280/642 X |
| 4,415,180 | 11/1983 | Payne, Jr. | 280/650 |

Primary Examiner—Joseph F. Peters, Jr.
Assistant Examiner—Michael Mar
Attorney, Agent, or Firm—Lyon & Lyon

[57] ABSTRACT

A foldable infant stroller which may be released and folded to a closed position or unfolded to an open position by one hand. The design and construction of the stroller is such that simply pushing or pulling on the handle portion of the stroller against the front wheels of the stroller moves the stroller from a folded or unfolded position. A latch mechanism may be activated by means of depressing a knob located in close proximity to the handle bar portion of the stroller, allowing the knob to be depressed simultaneously with pulling or pushing on the handle bar portion to fold or unfold the stroller. A hook mechanism, actuated by the knob on the handle bar portion of the stroller will engage either of a pair of catches to hold the stroller in either the folded or unfolded position.

5 Claims, 7 Drawing Figures

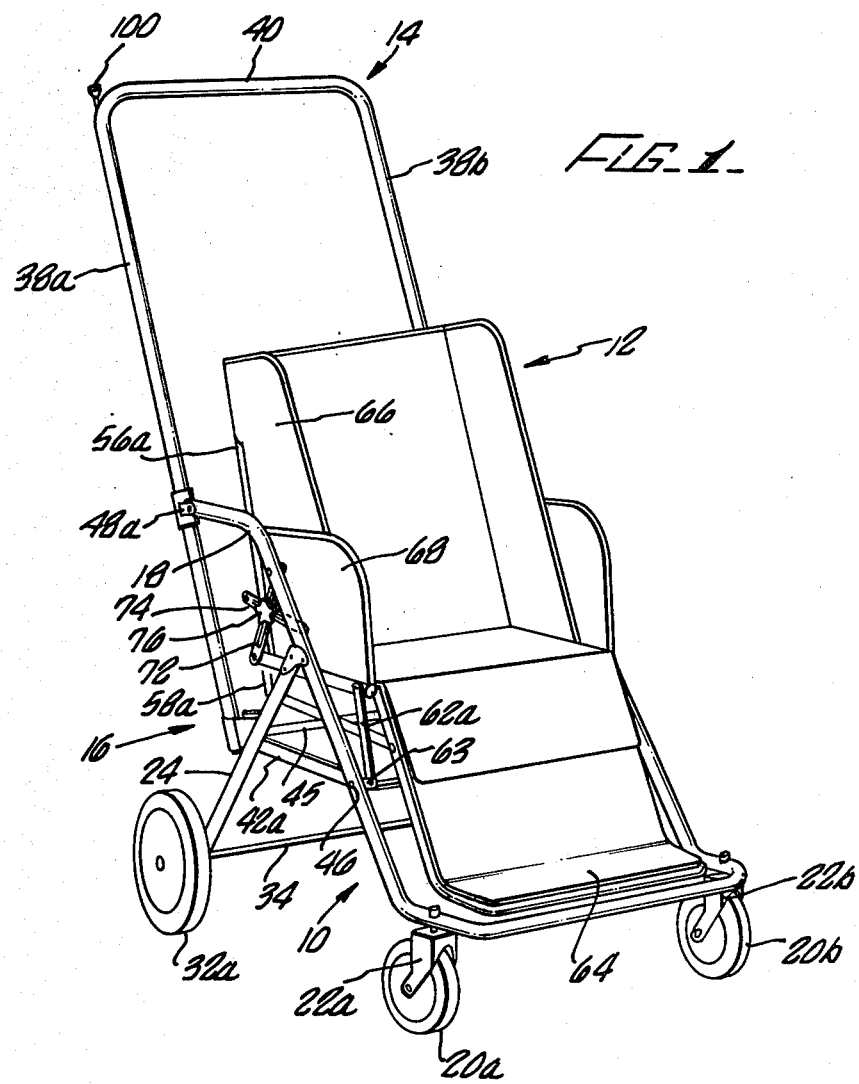
FIG_1.
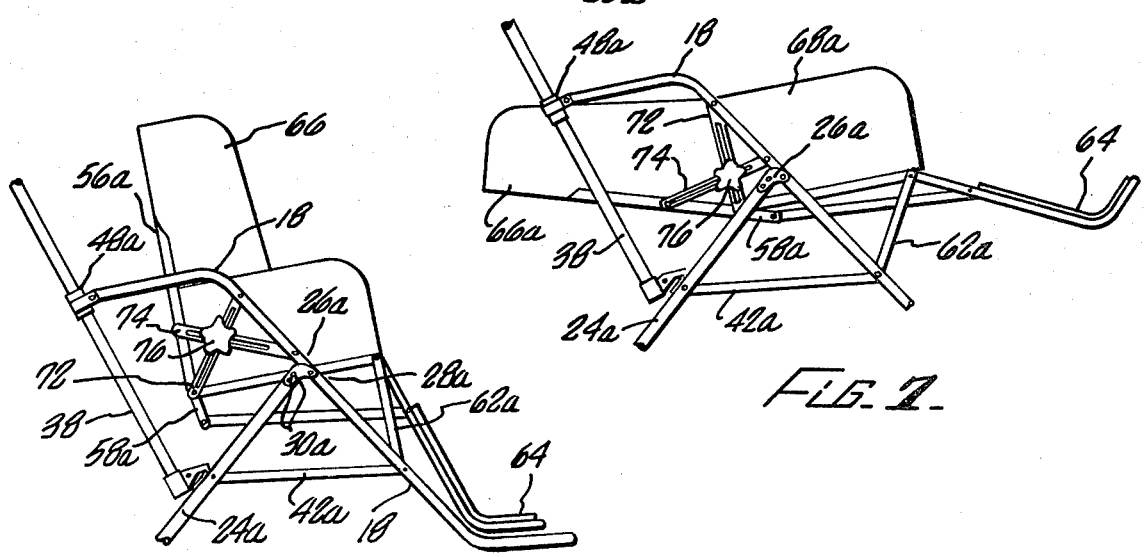
FIG_6. FIG_2.

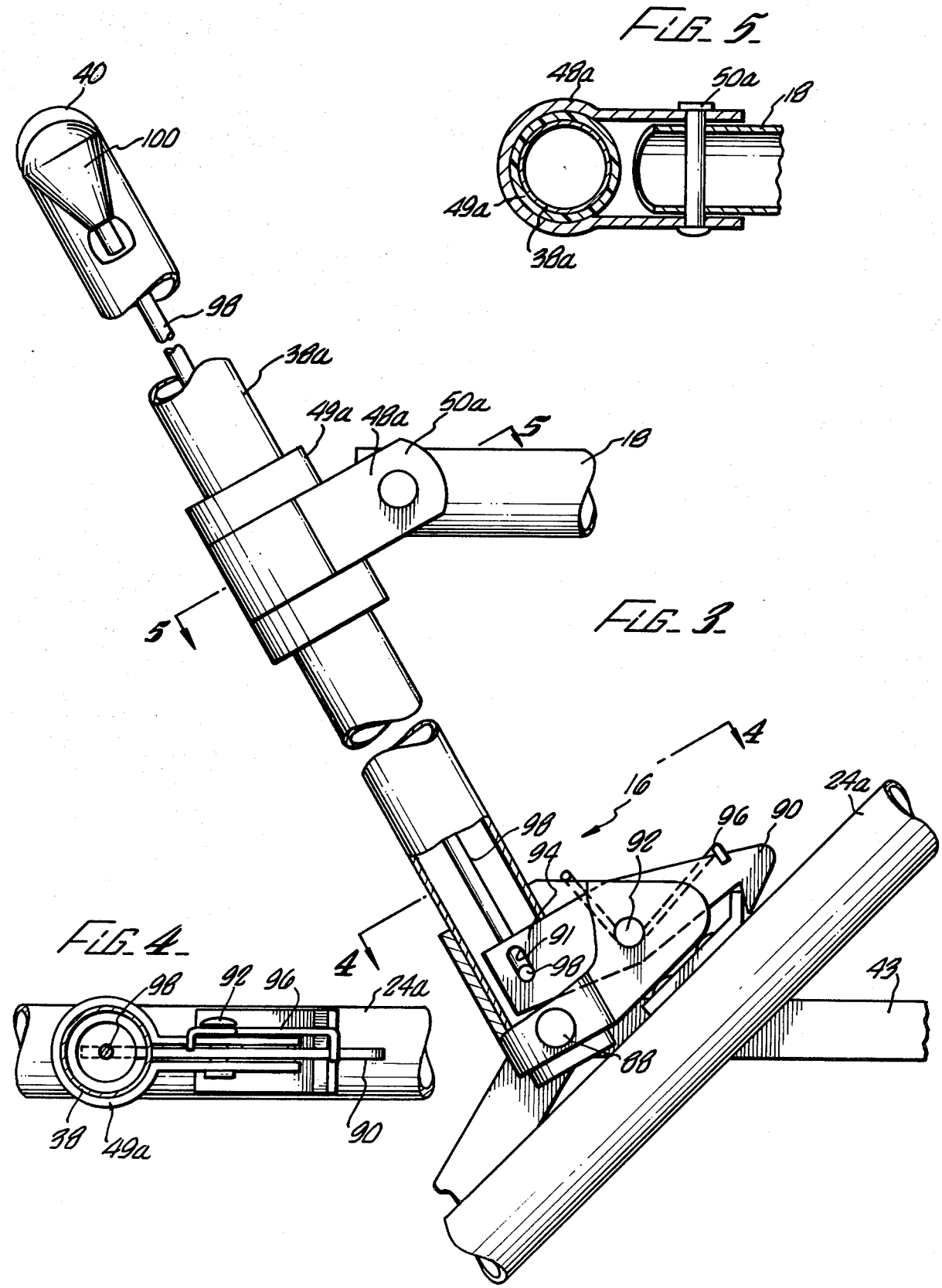

FOLDABLE INFANT STROLLER

BACKGROUND OF THE INVENTION

The device of this invention pertains to infant strollers which may be folded to a more compact, closed position for travel or storage, and easily unfolded and locked into an open position for use.

Infant strollers and the like are known in the art. There are various different types of infant strollers. There are the rigid carriers which remain in the open, usable position at all times. There are foldable strollers, which may be brought into a more compact folded position when not in use, either for ease of storage or travel. There are also strollers which incorporate a soft seat assembly, somewhat like a hammock. Others incorporate a rigid seat body. Although the rigid seat variety is preferable for many reasons, it is more difficult to construct a rigid seat assembly which is easily foldable.

Ease of folding is a primary objective in the design and construction of any foldable infant stroller. Preferably, the folding operation should be accomplishable by use of one hand only. This is because the operator of the carrier will be holding the infant, which had previously occupied the stroller, in the other hand. Additionally, because the operator will typically be holding the infant in one hand, the operation by which the stroller is folded or unfolded should be accomplishable without requiring the operator to bend, stoop or engage in other uncomfortable and difficult physical gyrations.

Another primary objective of any foldable infant stroller is that the stroller be easily and securely locked into the open position, and just as easily and securely locked into the folded position.

Thus, it is the object of the present invention to provide an improved foldable infant stroller which is lockable in the open position and foldable to a closed position by means of a simple, single movement, utilizing one hand of the operator, without requiring the operator to bend or stoop.

Another object of the present invention is to provide a foldable infant stroller which will securely and reliably lock in the open position but which will also easily and quickly fold and lock to the closed position.

Other and further objects of the invention will be apparent to one skilled in the art from a review of the figures and a reading of the detailed description of the preferred embodiment and the appended claims.

SUMMARY OF THE INVENTION

The present invention provides a novel design for a foldable infant stroller wherein the carrier may be folded and locked in a closed position, or unfolded and locked in an open position, by a simple, single operation which may be conducted by the operator of the stroller while in a standing position, utilizing only one hand.

The stroller has a main frame assembly which supports a seat assembly depended therefrom. A U-shaped member is attached to the main frame assembly such that it acts as the handle portion of the stroller. The main frame assembly is designed and constructed and is attached to the U-shaped member in such a way that the frame is folded and unfolded upon movement of the U-shaped member only. That is, by pushing down on the U-shaped member against the front wheels of the stroller, (held stationary either by tipping the stroller forward so that pushing on the U-shaped member pushes the wheels against the ground, or by placing the front wheels against a wall or other stationary object, or by using one's foot to secure the front wheel), the stroller is brought to a folded position. By pulling up on the U-shaped member, the stroller is brought to an open position.

This invention also presents a novel latching apparatus which secures the stroller in both the open and folded positions. The trigger or actuating portion of this apparatus is located on or near the base or handle portion of the U-shaped frame member such that it can be activated by the same hand of the operator which will grasp the U-shaped member to push the stroller closed or to pull it open. This latch assembly comprises a pivotable hook attached to the end of U-shaped frame member, which hook can be brought into or out of engagement with two latches on one of the rear leg frame members of the stroller. The catches are situated on the frame such that the hook will engage one of them when the stroller is in the fully unfolded, open position, and will engage the other of them when the stroller is in the fully closed, or folded position.

This novel design and construction allows the operator to fold the stroller by simultaneously depressing the actuator device on the base or handle portion of the U-shaped member and pushing down on that U-shaped member. Conversely, the stroller may be brought to the unfolded or open position by simultaneously depressing the actuator device and pulling up on the U-shaped member.

DESCRIPTION OF THE FIGURES

FIG. 1 is a perspective view showing the foldable infant stroller in the locked, unfolded or open position.

FIG. 3 is a side view of the latch mechanism of this invention.

FIG. 4 is a top view taken along the line 4—4 in FIG. 3 showing the hook mechanism.

FIG. 5 is a top view taken along line 5—5 in FIG. 3 showing the manner in which the upper frame member is slidably attached to the U-shaped member.

FIG. 6 is a side view of the seat assembly in an upright position.

FIG. 7 is a similar side view showing the seat assembly in a fully reclined position.

DESCRIPTION OF THE PREFERRED EMBODIMENT

Figure 2:
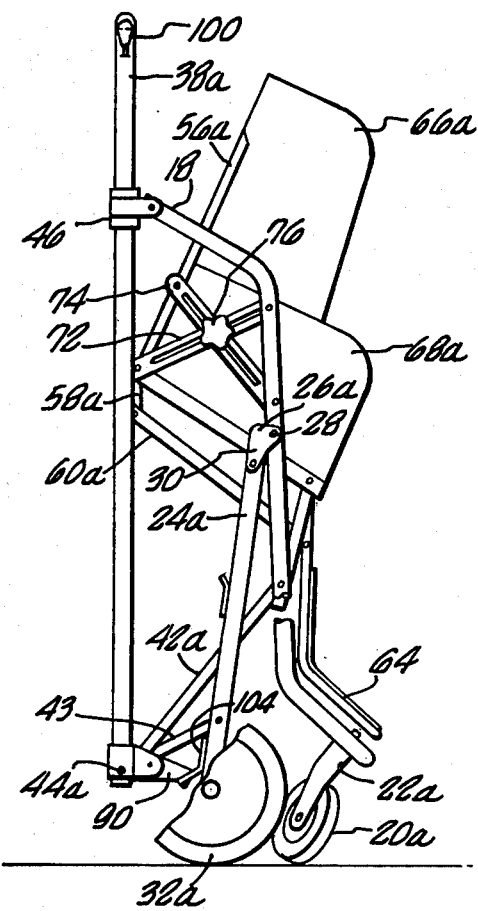
FIG. 2 is a side view showing the stroller according to this invention in the locked, closed, or folded position. A portion of one of the rear wheels is cut away to show the engagement of the hook with the second latch on one of the rear leg frame members.

The invention is here shown embodied in a foldable infant stroller. However, it should be understood that the inventive features may be incorporated into other similar devices and that the invention is not limited to this presently preferred embodiment, but is of the full breadth of the full scope of the appended claims.

The infant stroller comprises generally a main frame assembly 10, a seat assembly 12, the handle bar assembly 14, and the latch assembly 16.

The infant stroller shown, except for latch assembly 16, is largely symmetrical about a central vertical plane which bisects the stroller from front to rear. Accordingly, reference to elements which are symmetrically incorporated will be made by the same reference number, distinguishing them as "a" and "b" (viz. 1a and 1b).

In the preferred embodiment, the main frame assembly 10 is constructed of lightweight tubular or flat metal. It has a unified top frame member 18. Top frame member 18 is U-shaped from a top view, and is S-shaped from a side view. As can be seen in FIGS. 1 and 2, top frame member 18 provides the transverse side portion to the main frame assembly 10 as well as the front portion of main frame assembly 10 to which are attached front wheels 20a and 20b. Front wheels 20 are preferably attached such that the journals 22a and 22b are freely pivotable on top frame member 18.

Attached to the approximate center point of the side portion of the top frame member 18, and extending rearwardly and downwardly therefrom are rear leg frame members 24a and 24b (24b not shown). The rear leg frame members 24 are pivotably attached to the top frame member 18 by conventional brackets 26a and 26b, and journal pins 28a and 28b, and rivets 30a and 30b. It will be appreciated that the rivets 30 attaching rear leg frame member 24 to bracket 26 prevent movement of rear leg frame member 24 with respect to bracket 26. Further, the construction of bracket 26 is such that as it swings through its rotational arc about journal pin 28, the bracket will contact top frame member 18 so that the rear leg member 24 cannot rotate further.

Rotatably attached at the distal end of rear leg members 24a and 24b are rear wheels 32a and 32b. Axel 34 extends between rear wheels 32a and 32b.

The handle bar assembly 14 has a U-shaped member 36. U-shaped member 36 has two side portions 38a and 38b and a base portion 40. U-shaped member 36 has a multitude of functions. A first function is to act like the handle bar for the stroller. For this purpose, it is situated such that it extends upwardly and rearwardly from the main frame assembly 10 to a position where it may be comfortably grasped by the operator of the stroller. The distal ends of side portions 38a and 38b are attached to the main frame assembly 10 by means of cross-piece members 42a and 42b which extend from the U-shaped member 36, where it is attached by journal pins 44a and 44b, to top frame member 18, where it is attached by journal pins 46a and 46b; and by means of cross members 43a and 43b, which are attached to rear leg members 24. The relative dimensions of cross-piece members 42a and 42b, 43a and 43b, their attachment to top frame member 18 and rear leg members 24a and 24b are such that when the stroller is in the open position, the ends of side portion 38a and 38b of U-shaped member 36 come into contact with rear leg members 24a and 24b so that downward pressure on U-shaped member 36, as when the stroller is being pushed forward, is communicated directly to rear leg members 24a and 24b and hence to the main frame assembly 10. Cross members 43 are of a unitary construction, having a cross piece 45 which connects them.

The top frame member 18 is slidably attached to the side portions 38a and 38b of U-shaped member 36 by means of brackets 48a and 48b and bushings 49a and 49b (see FIG. 5). The bushings 49 slide up and down U-shaped member 36 as the stoller is folded or unfolded. The brackets 48 are held fixably to top frame member 18 by means of conventional rivets 50a and 50b.

The seat assembly 12 is comprised of a seat back portion 52 and a seat bottom portion 54. Both portions can be constructed of any light weight, durable material. Both portions are supported by tubular members 56a and 56b. The seat assembly 12 is depended from the main frame assembly by means of a series of innerconnected support bars 58, 60 and 62a and b. Support bars 62 have a member 63 extending between them. A foot rest 64 is attached to the seat assembly 12.

The seat back portion 52 and the seat bottom portion 54 are equipped with protective side boards 66a and 66b and 68a and 68b. These may all be covered with a removable fabric.

The seat assembly 12 is made adjustable, relative to the main frame assembly 10, from a fully upright, sitting position, to a fully reclined position, by the adjustment apparatus 70. Adjustment apparatus 70 has two adjustment bars 72 and 74. (There are two such mirror-image bars on the other side of the seat assembly, but are for support only, not adjustment). These adjustment bars are each attached at one end to the tubular section 56a of the seat back portion and at the other end to top frame member 18. The adjustment bars 72 and 74, as well as the support bars 58, 60 and 62 allow the seat assembly 12 to move freely from the upright to the reclined position. The seat assembly is held in any particular position by means of the handle screw 76 which is threaded through bisecting slots 78 and 80 in the adjustment bars 72 and 74. When the desired position of the seat assembly 12 is obtained, the handle screw 76 is tightened to stop further movement of the adjustment bars 72 and 74 with respect to one another. This precludes further movement of the seat assembly with respect to the main frame assembly. It will be appreciated that this adjustment means provides for infinite positional adjustment of the seat assembly 12 with respect to the main frame assembly 10.

The latch assembly 16, best shown in FIG. 3, comprises a hook assembly 84 which is attached to the distal end of a side portion 38a of U-shaped member 36. The hook assembly has a bracket 86 which encircles the end of side portion 38a and which is fixably attached thereto by means of rivet 88. The hook 90 is pivotably attached to the bracket 86 by means of journal pin 92. The heel portion 94 of hook 90 extends through a slot in side portion 38a to the interior thereof. A spring 96 biases hook 90 to the "down" or "engaged" position.

Within side portion 38a is a push/pull rod 98. This rod is attached to the heel portion 94 of hook 90 by means of a slotted aperture 91 in said heel portion through which rod 98 extends such that the pulling or pushing on rod 98 causes hook 90 to pivot about journal pin 92. The push/pull rod 98 extends upwardly through side portion 38a and exits side portion 38a near the base portion 40. There, a knob 100 is attached to the end of push/pull rod 98. The knob 100 is situated just to the side of base portion 40, and substantially on a level with it. This close proximity of knob 100 to base portion 40 allows the operator of the stroller to manipulate actuator knob 100 while holding on to base portion 40. It will easily be appreciated that by pushing knob 100, the push/pull rod 98 will cause hook 90 to pivot upwardly about journal pin 92, and that this operation can be accomplished simultaneously, with the same hand, as U-shaped member 36 is being pushed or pulled.

Fixably attached to the rear member 24 are a hook catch 102 and a second hook catch 104. The interrelationship of main frame assembly 10 and the U-shaped member 36 is such that as the stroller is pulled to or from the open to the folded or closed position, the distal end of side portion 38a of U-shaped member 36 remains in close proximity to rear leg member 24a. Accordingly, hook 90 stays in close proximity as well. When the stroller is in the fully opened or unfolded position, hook 90 will engage first hook catch (see FIG. 3). This will retain the stroller in the open or unfolfed position. When the stroller is in the closed or folded position, the hook 90 will engage second hook catch 104 (see FIG. 2) to retain the stroller in the folded position.

It will be readily appreciated that by depressing knob 100, the hook 90 will be caused to disengage either hook catch 102, or second hook catch 104, depending on whether the stroller is at that time in the open or folded position, allowing the stroller to be folded, or unfolded, as the case may be. It will be further appreciated that due to the design, construction and interrelationship of the main frame assembly 10 and handle bar assembly 14, the folding or unfolding operation is accomplished by pushing down on U-shaped member 36 (to fold the stroller) against the front wheels of the stroller or pulling up on U-shaped member 36 (to open the stroller). It will also be appreciated that this push or pulling of U-shaped member 36 can be accomplished with one hand, and that the same hand can, simultaneously with pulling or pushing U-shaped member 36, depress knob 100 to disengage hook 90 from hook catches 102 or 104.

Thus, a novel design and construction for a foldable infant stroller has been specifically set forth above. It is to be understood, however, that the invention claimed herein is not limited to the precise description of the embodiment set forth above. The inventive concepts claimed herein permit many and varied modifications on this preferred embodiment. Accordingly, the invention is not so limited, but is of the full breadth and scope of the appended claims.

What is claimed is:

1. An infant stroller, foldable from an open position to a more compact closed position by a simple one hand operation, the stroller comprising:
   a. a main frame assembly having pivotally attached frame members foldable between open and closed positions;
   b. a U-shaped member, having side portions and a base portion, the side portions of which are attached to said frame assembly, such that downward movement of said U-shaped member causes said frame assembly to fold, and upward movement causes said frame assembly to unfold, said base portion of said U-shaped member extending rearwardly and upwardly therefrom to a position where it may be grasped and used as a handle by the operator of the stroller;
   c. a seat assembly attached to said frame; and
   d. means for securing the carrier to a closed position and to an open position, said means comprising:
      (i) a latch assembly on said U-shaped member, said latch assembly having a hook pivotally attached to said U-shaped member and actuating means for causing the hook to pivot, said actuating means extending up said U-shaped member to a position on the base portion of said U-shaped member where it may be comfortably reached by the hand of a standing operator of the carrier; and
      (ii) first and second catches attached to said frame and positioned such that said hook engages the first of said catches when the carrier is in the open position and the second of said catches when the carrier is in the compact, closed position.

2. The invention of claim 1 wherein said actuating means further comprises a push/pull rod attached to said hook, and extending upwardly therefrom through said side portion of said U-shaped member to a position near the juncture of said side portion and said base portion of said U-shaped member, wherein said push-pull rod extends a distance thereabove to be accessible to the operator of the carrier, and be pushed or pulled to cause the hook to pivot.

3. The invention of claim 2 wherein said hook assembly has biasing means for biasing said hook to the position for engagement with said catch.

4. The invention of claim 3 wherein said main frame assembly further comprises a top frame member having pivotally attached thereto, and extending downwardly and rearwardly therefrom, a pair of rear leg members, said rear leg members pivotable through an arc which brings said top frame member and said rear leg members into approximate parallel alignment, said rear leg members pivotally attached, near its end distal from the top frame member, to said side portion of said U-shaped member, and said top frame member slidably attached to said side portions of said U-shaped member such that movement of said U-shaped member causes said rear leg members to rotate vis-a-vis said top frame member, while said top frame member slides along said U-shaped member to either fold or unfold said main frame assembly.

5. The invention of claim 4 further comprising a first pair of wheels attached to said top frame member and a wheel attached to each of said rear leg members.

* * * * *